(12) United States Patent
Kasmai

(10) Patent No.: US 9,704,163 B2
(45) Date of Patent: Jul. 11, 2017

(54) SECONDARY MARKET FOR GIFT CARDS WHERE SECONDARY MARKET TRANSACTIONS DO NOT PHYSICALLY TRANSFER THE SAME GIFT CARD BETWEEN A SELLER AND A PURCHASER

(76) Inventor: Hossein Kasmai, Miami, FL (US)

( * ) Notice: Subject to any disclaimer, the term of this patent is extended or adjusted under 35 U.S.C. 154(b) by 827 days.

(21) Appl. No.: 13/086,128

(22) Filed: Apr. 13, 2011

(65) Prior Publication Data

US 2011/0295705 A1 Dec. 1, 2011

Related U.S. Application Data

(60) Provisional application No. 61/344,118, filed on May 27, 2010.

(51) Int. Cl.
*G06Q 30/00* (2012.01)
*G06Q 20/10* (2012.01)
*G06Q 20/20* (2012.01)
*G06Q 40/00* (2012.01)

(52) U.S. Cl.
CPC .......... *G06Q 30/00* (2013.01); *G06Q 20/105* (2013.01); *G06Q 20/20* (2013.01); *G06Q 40/12* (2013.12)

(58) Field of Classification Search
None
See application file for complete search history.

(56) References Cited

U.S. PATENT DOCUMENTS

2010/0325006 A1\* 12/2010 White ............................ 705/26
2011/0079644 A1\* 4/2011 Wolfe et al. .................. 235/380

\* cited by examiner

*Primary Examiner* — F. Zeender
*Assistant Examiner* — Denisse Ortiz Roman
(74) *Attorney, Agent, or Firm* — Patents on Demand P.A.; Brian K. Buchheit; Scott M. Garrett

(57) ABSTRACT

A secondary entity can purchase a gift card from a card holder. The secondary entity can extract complete information including identification and access information from the gift card and store this information on a database. The physical artifact of the gift card can then be optionally discarded or recycled. This information including the credit value can then be sold independent of the physical artifact (e.g., original gift card object) within the secondary market. When sold, the specific information for the original gift card is extracted from the database and programmed into a new artifact (i.e., blank gift card), which may be at a different location as the original gift card. For example, the credit value can be made accessible from a different physical artifact, which can be physically conveyed to a value purchaser. This different physical artifact can be utilized in the same manner as the original gift card. In one embodiment, the secondary entity can be remunerated for facilitating the transactions between the card holder and the value purchaser.

11 Claims, 4 Drawing Sheets

SECONDARY MARKET FOR GIFT CARDS WHERE SECONDARY MARKET TRANSACTIONS DO NOT PHYSICALLY TRANSFER THE SAME GIFT CARD BETWEEN A SELLER AND A PURCHASER

CROSS REFERENCE TO RELATED APPLICATIONS

This application claims the benefit of Provisional Application Ser. No. 61/344,118 entitled "BUSINESS METHOD AND MODEL FOR TRADING AND RESELLING GIFT CARDS GLOBALLY", filed May 27, 2010, which is herein incorporated by reference in its entirety.

BACKGROUND

The present invention relates to the field of gift cards and, more specifically, to a secondary market for gift cards, where a secondary market transaction does not physically transfer the same gift card between a seller and a purchaser.

Many retailers of consumer goods and services institute gift cards, where a value of credit valid for purchases from that retailer can be purchased using a negotiable instrument (e.g., cash or its equivalent). The credit on the gift card is treated as a cash equivalent by the retailer, but otherwise lacks value (e.g., is unable to be utilized for purchases with other retailers). The gift card represents a credit artifact that is freely transferrable between consumers. That is, the gift card is not bound to a specific purchaser (as is a credit or debit card), but may be conveyed to anyone, where the retailer is contractually obligated to honor the credit on the card, when the card is presented by a bearer. Thus, a gift card is considered a bearer instrument.

The credit value of the gift card cannot typically be converted back to cash, once purchased initially. Instead, the credit value of the gift card is only usable for purchases between a consumer (e.g., bearer) and the identified retailer. For example, a gift card associated with Retailer X must be used for purchases of Retailer X only and cannot be used for purchases involving other retailers. It is not uncommon for a consumer to receive or possess gift cards for one or more retailers that the consumer doesn't favor. In this case, the consumer has credit for a retailer by virtue of possessing/owning the gift card, which the consumer will not use (or at least which the consumer values significantly less than the credit value accessible via the gift card, which can be referred to as the face value of the gift card).

BRIEF SUMMARY

One embodiment of the disclosure is for a secondary market for gift cards linked to a retailer credit. In this secondary market, a business entity not directly associated with the original purchase of a gift card purchases the gift card from a bearer (also referred to as a card holder). The gift card can be a physical artifact conveyed to the business entity (referred to as a secondary entity) involved in the secondary market. The secondary entity can read complete information including identification and accessing information from the gift card, can store this information on a database, and may thereafter discard or recycle the physical artifact of the gift card (i.e., the card itself). This information including the credit value that the original gift card provided access to can then be sold independent of the physical artifact (e.g., original gift card object) within the secondary market. When sold, the specific information for the original gift card is extracted from the database and is programmed into a new artifact (i.e. blank gift card), which may be at a different location as the original gift card, thus providing an equivalent version of the original gift card. For example, the credit value can be made accessible from a different physical artifact, which can be physically conveyed to a purchaser (referred to as a value purchaser). In one embodiment, making the credit value accessible can occur by placing credit accessing information on the different physical artifact, where the credit value is actually maintained by a gift card accounting system that is usually controlled by the retailer. This different physical artifact can be utilized in the same manner as the original gift card. In one embodiment, the secondary entity can be remunerated for facilitating the transactions between the original purchaser (card holder) and the secondary market purchaser (value purchaser).

The disclosure can have numerous aspects, which are detailed herein. For example, one aspect of the disclosure can include a system, an apparatus, a computer program product, and a method for providing credit value of a gift card to a purchaser within a secondary market independent of physical transfer of the gift card originally used to access the credit value. In this aspect, a gift card can be received from a gift card holder. The gift card can be a physical artifact that provides access to a credit value. The credit value can be valid only for a specific retailer. The gift card can be a bearer instrument able to be utilized independent of an identity of a user of the gift card, thereby permitting any holder of the gift card to utilize the gift card regardless of holder identity. The gift card holder can be remunerated in a first secondary market transaction in exchange for transfer of gift card ownership from the gift card holder to a secondary market entity. The credit value of the gift card can be resold in a second secondary market transaction in which ownership of the credit value is transferred from the secondary entity to a value purchaser. The reselling occurs without physically transferring the gift card received from the gift card holder to the value purchaser. This is accomplished by reading the credit access information (typically stored in the mag strip or RFID or smart card) of the original gift card and by storing this information onto a database and then programming this information onto a secondary blank gift card at the same or different physical location than the original gift card. After the reselling occurs, the value purchaser is able to utilize the credit value in commerce transactions with the specific retailer.

Another aspect of the disclosure can include a gift card that is a physical artifact that provides access to a credit value. The gift card can include a graphic printed on the gift card that includes a mark, icon, text, or other identifier that corresponds to at least one specific retailer. The card can also include a key associated with a value credit for the at least one specific retailer. The gift card can be a non-negotiable instrument that is a bearer instrument. The gift card can be considered to provide access to the credit value, as a bearer is able to present the gift card to at least one specific retailer during a transaction in which the bearer purchases goods or services from the at least one retailer. The credit value of the gift card can be utilized as an equivalent of cash during the transaction. The credit value of the gift card can be placed on the gift card during a secondary market transaction. The original gift card can be a physical artifact different from this gift card.

Another aspect of the disclosure can include a system, an apparatus, a computer program product, and a method for handling gift cards. In this aspect, a secondary entity can purchase an original gift card from a card holder. The gift card can provide access to a quantity of pre-paid credit, which is referred to as a credit value, for a particular retailer. The original gift card can include access information for this credit value. The access information can provide access to a gift card accounting system, which maintains the credit value of the original gift card with a data base. The gift card accounting system can ensure that the retailer is provided with the credit value when the original gift card is used in a commercial transaction. The secondary entity transferring the access information to a different gift card, where the different gift card provides access to the credit value. The different gift card can be sold to a value purchaser.

DETAILED DESCRIPTION

Figure 1:
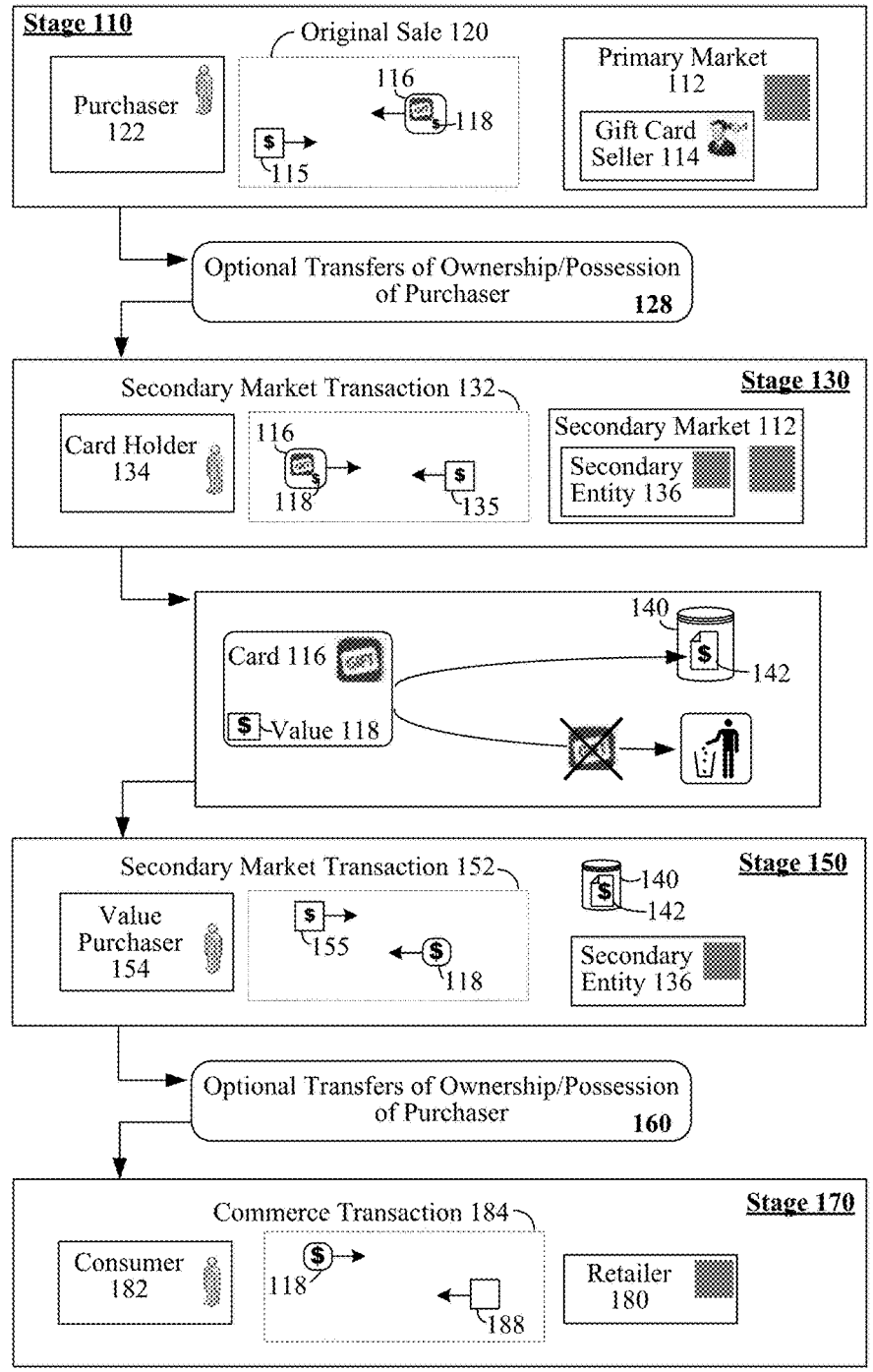
FIG. 1 shows a diagram for gift card value transfer via a secondary market without transfer a physical artifact in accordance with an embodiment of the inventive arrangements disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a diagram for gift card value transfer via a secondary market without transfer a physical artifact in accordance with an embodiment of the inventive arrangements disclosed herein. FIG. 1 is shown in multiple stages 110, 130, 150, and 170. These stages can occur at different times. An arbitrary delay period can exist between the stages 110, 130, 150, and 170.

In stage 110, an original sale 120 of a gift card 116 can occur between a purchaser 122 and a gift card seller 114. The gift card seller 114 can originate the sale of the gift card 116 in a primary market 112. In other words, the gift card seller 114 can be the retailer or can have a business affiliation with a retailer 180 (or set of retailers) to which the gift card 116 corresponds. This business affiliation (that of a licensed seller of gift cards for a retailer) can be that the retailer 180 authorizes the gift card seller 114 to provide credit value 118 for retailer 180 purchases for a fee. The purchaser 122 can pay this fee, which may include a possible surcharge added by the gift card seller 114. The transaction between the seller 114 and the purchaser 122 can be referred to as an original sale 120.

The gift card 116 can be a physical artifact that provides access to a credit value 118. This value 118 can be used for purchases with the retailer 180, as a cash equivalent. The credit value 118 can represent an amount of pre-paid credit for retailer 180 purchases. The gift card 116 itself can be considered a non-negotiable financial instrument, which is a bearer instrument, as it is able to be utilized by any holder regardless of holder identity.

As such, in stage 128, a series of optional transfers of the gift card 116 from one owner to another may occur. Thus, a card holder 134 of stage 130 may or may not be the same individual as the purchaser 122. Stage 130 includes a secondary market transaction 132, where the card holder 134 transfers ownership and/or physical possession of the gift card 116 to a secondary entity 136 for remuneration 135. The secondary entity 136 can be a legal entity (business, organization, individual, etc.) that may be unaffiliated with the retailer 180 or the gift card seller 114. That is, the secondary entity 136 need not have a contractual relationship with retailer 180 to conduct secondary market transaction 132 (or secondary market transaction 152).

The secondary entity 136 can extract the information that provides access to the credit value 118 from the payment artifact 116. This credit value 118 and/or any access information needed to realize the value 118 can be, for example, stored in a storage medium 140 (such as mag strip, RFID, or Smartcard) as a digitally encoded record 142. Once the access information for the credit value 118 has been extracted from gift card 116, the physical artifact of the gift card 116 can be optionally destroyed or recycled.

This need not happen in all embodiments, as the credit value 118 is accessible based on access information whether or not the original gift card 116 has been destroyed or recycled. Destroying or recycling the original gift card 116 can be a safeguard to ensure that the credit value 118 isn't diminished after ownership transfer to the secondary entity 136 occurs. For example, in one contemplated embodiment, the original gift card 116 can be intentionally preserved by the secondary entity 136, to serve as proof of ownership of the original gift card 116 and/or to provide a "backup" of the access information for the credit value 118, should some system error occur (such as a record 142 being corrupted).

In stage 150, secondary market transaction 152 can occur at the same or a different physical location (after an optional delay period from transaction 132 of an arbitrary duration) between a value purchaser 154 and the secondary entity 136. In transaction 152, value purchaser 154 can provide remuneration 155 in exchange for ownership of the credit value 118. When ownership of the credit value 118 is transferred, records 142 of data store 140 can be updated accordingly to reflect this transfer. During secondary market transaction 152, the credit value 118 (or access information for using the credit value 118) may, but need not, be encoded on a physical payment artifact different from the physical artifact represented by gift card 116.

A series of zero to more (0 . . . N) optional transfers of the value 118 can occur after the secondary market transaction 152, as shown by step 160. Thus, the ultimate possessor (consumer 182) of the credit value 118 may or may not be the value purchaser 154. In stage 170, a commercial transaction 184 can occur between the consumer 182 and retailer 180, where the credit value 118 is provided in exchange for receiving a good/service 188 from retailer 180.

It should be appreciated that a quantity of the credit value 118 may or may not remain a constant throughout transaction 120, 132, 152, and 184. For example, the entire amount of the gift card 116 from the original sale 120 may be transferred to consumer 182 and used during commerce transaction 184. In another example, a portion of the value credit value 118 can be used between original sale 120 and secondary transaction 132, which causes the value indicated by record 142 to differ from the origin purchase value of sale 120. Similarly, the credit value 118 transferred to purchaser 154 during transaction 152 may not be the same as the value 118 used in commercial transaction 184. For example, consumer 182 can utilize a portion of the value 118, while retaining another portion. Additionally, some of the credit value 118 can be used for purchases with the retailer 180 during any of the transfer-of-ownership periods, represented by step 160.

Figure 2:
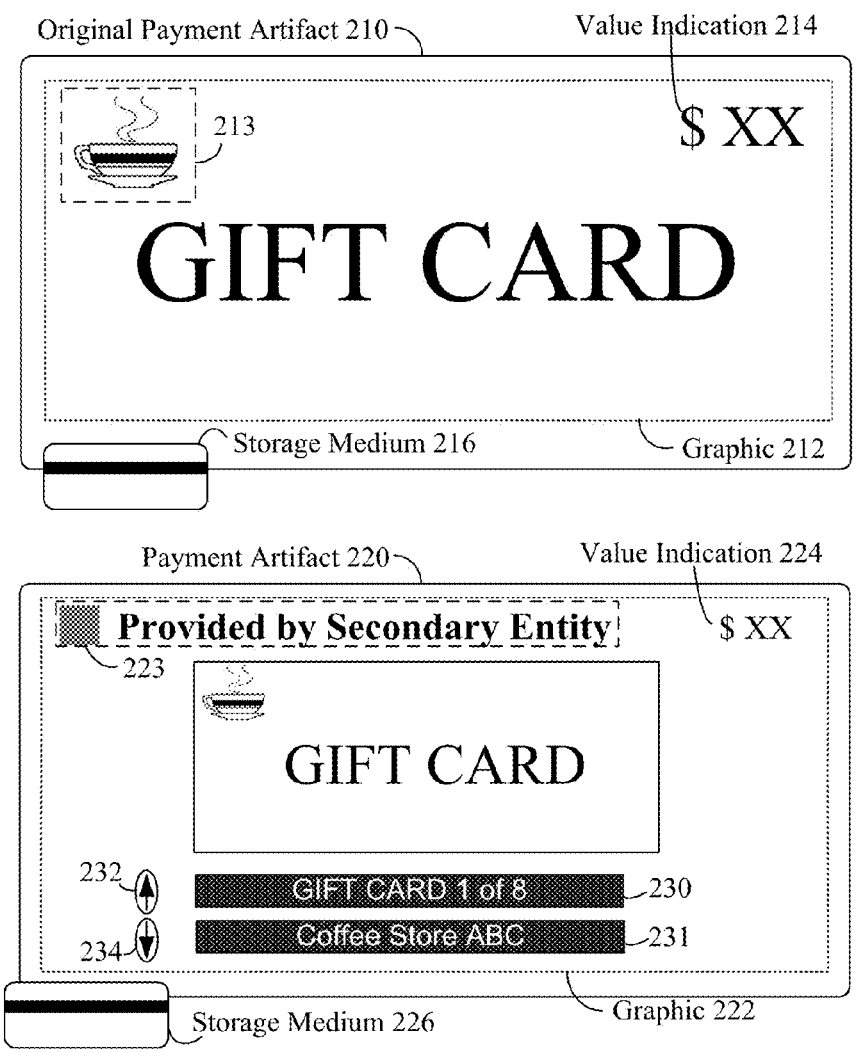
FIG. 2 illustrates differences between an original gift card and artifacts ultimately utilized during a commercial transaction where value from the original gift card is utilized.
Figure 2:
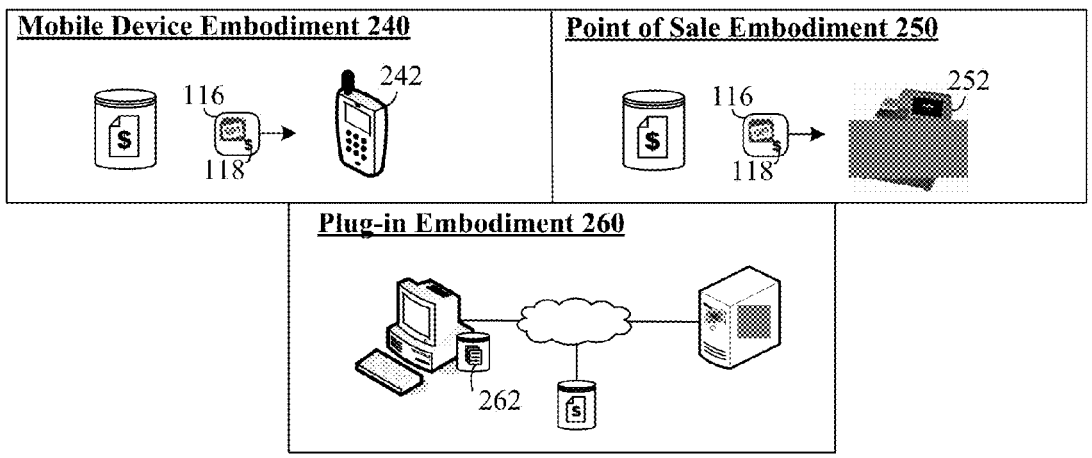

FIG. 2 illustrates differences between an original gift card and artifacts ultimately utilized during a commercial transaction where value from the original gift card is utilized.

The original gift card 210 (e.g., the gift card 116 provided to purchaser 122 in the original sale 120) can include a graphic 212 printed on the front and/or back of the card 210. An optional graphic 213 can be part of graphic 212. Graphic 213 can indicates the retailer (e.g., retailer 180) or set of retailers to which the gift card 210 corresponds. For example, the graphic 213 can include a logo, text, and the like. The gift card 210 can optionally include a value indication 214 that indicates a credit value that the gift card 210 provided access to at the time of the original sale. It should be emphasized that indication 214 is optional, as it is increasingly common for gift cards 210 to not include a value indication 214, especially in situations where a generic card can be purchased for any value desired by the original purchaser. Gift card 210 can also include a region and/or component 216 within which access information needed for utilizing the credit value is stored. Commonly, component 216 is implemented as a magnetic strip, which contains digitally encoded identification information for accessing the credit value. Original gift card 210 is not limited to use of a magnetic strip, however, and other mechanisms are contemplated, such as a barcode or an RFID storage region.

As noted by FIG. 1, the value 118 provided to a value purchaser 154 in the secondary market transaction 152 may be provided via a number of different mechanisms. Use of a different mechanism (other than the original gift card 116, 210) can be highly advantageous from a perspective of inventory management, transportation cost (e.g., shipping/mailing gift cards from one location to another), transaction time, etc.

To illustrate, a data store 140 (network accessible) can be established, which interacts with a plurality of geographically distributed locations (e.g., storefronts, kiosks, and the like). Any of these locations can receive an original gift card 116, 210 and upload information for accessing the credit value to the data store (e.g., secondary market transaction 132). This accessing information for the credit value can also be obtained from the data store and provided to a value purchaser (e.g., secondary market transaction 152). The contemplated and disclosed secondary market can efficiently and flexibly transfer credit value of a gift card (which can actually transfer accessing information for the credit value) in a variety of manners not possible without the innovations detailed in the disclosure.

For example, credit value can be flexibly provided to value purchasers in a variety of forms (embodiments 220, 240, 250, and 260 for example). In one contemplated embodiment, multiple gift cards 220 can be used to encode a shared credit value from a single original gift card 210. Thus, a set of family members (each having their own physical gift card 220) can share a credit value, even if these family members are located across the country. In this embodiment, the sharing occurs without significantly altering existent gift-card infrastructures. That is, each of the set of multiple gift cards 220 can include accessing information for the gift card accounting system, which records the credit value. Each time any of these multiple cards 220 is used, the credit value maintained by the accounting system is diminished accordingly.

One option of the disclosure is to provide credit value during a secondary market transaction within a physical gift card 220. Specifically, this can mean writing access information to the physical gift card 220, where the access information is linked to a gift card accounting system. Like gift card 210, gift card 220 can include a graphic 222, an optional value indication 224, a value access component 226, and the like. The graphic 222 can be the same or can be different from the graphic 214 found on the original card 210. For example, a smaller image of the original graphic 214 can be shown on the card 220 along with a logo or other identifier 223 for the secondary entity that conducted the secondary market transactions (e.g., transaction 132 and/or 152). Thus, the graphic 222 of gift card 220 can include a branding and marketing opportunity (image 223) for the secondary entity to promote the secondary transactions involving gift cards.

Of course, any graphic desired can be utilized as the graphic 222 of gift card 220. This can be highly advantageous to value purchasers (e.g., purchaser 154), who may not be able to customize the original gift card 210 to suit his/her preferences. For example, a business entity may provide gift cards to their clients at holiday times, yet strongly desire to brand these cards, which is possible with card 220 even if it is not possible with the original gift card 210. In one embodiment, a value purchaser can customize the gift card 220 with any desired graphic 222, such as a graphic uploaded by the value purchaser and able to be printed to card 220. For example, a family may want to give gift cards for the holidays, which have a family photo (e.g., a custom graphic 222) on them.

Additionally, in one embodiment, a different type of access component 226 can be used on gift card 220 than what is used on the original gift card 210. For example, the original gift card 210 can include only a magnetic strip, which makes it difficult if not impossible to use the credit value of the gift card 210 for Web purchases. The component 226 of the corresponding card can include a magnetic strip able to be used in a manner equivalent to the original card's (210) magnetic strip as well as include an access code, which can be used for Web purchases at the retailer's Web site. In another embodiment, the gift card 220 from the secondary market can include an RFID tag for RFID enabled point-of-sale devices, even when the original gift card 210 lacks such a mechanism.

In one contemplated embodiment, the gift card 220 can be a reusable one used for loading value from any set of secondary market transactions. In such an embodiment, credit value obtained from multiple original gift cards 210 can be concurrently accessible from a single gift card 220. To illustrate, the gift card 220 (capable of storing access information from multiple different original gift cards 210) can include a card display region 230 linked to section buttons 232, 234. When each selection button 232, 234 is pressed, a different "original gift card" can be displayed in the card 230 region. Other portions of the card 220 can be changed to match, such as changing a store 231 display for to match the currently shown card, changing the value of the current card (shown in indication 224, for example), and the like. In this embodiment, selection via buttons 232, 234 can also result in changes to component 226, so that only the displayed gift card (e.g., card 1 of 8) shown in section 230 can be accessed when read by a reader of a retail establishment (i.e., when conducting commerce transaction 184).

Another contemplated embodiment (shown as embodiment 240) permits a value purchaser to access the credit value using his/her mobile device 242. For example, an ANDROID based phone can include a gift card application, which enables credit values 118 from the original gift card 116 to be utilized for purchases. In one embodiment, purchases (ones that utilize value 118) can be conducted via a retailer's Web site (straight from an internet-enabled browser of device 242). In one embodiment, the device 242 can display or transmit a code including a bar code, which a point of sale device of the retailer can read, which causes credit value 118 to be utilized during a commerce transaction 184.

In point of sale embodiment 250, a point of sale device 252 can be utilized to conduct secondary market transactions 132 and 152. For example, a person can initiate the commerce transaction 184 and pay by credit card or debit card via a point of sale device 252 (e.g., card reader). The card-reader 252 can be integrated with secondary market functionality. The card reader 252 (or a computing device connected to the card reader) can execute programs that determine the consumer using the point of sale device is part of a gift-card secondary market network. Running code can then determine that a credit value exists for the retailer, which is available for less than face value (representing a savings for the consumer). The savings can trigger other code to exchange a quantity of "cash" or money obtained from the credit card/debit card scanned by the point of sale device 252 for a quantity of the credit value.

From a consumer perspective, the secondary market transactions occur transparently (occur responsive to executing code triggered by the consumers use of the point of sale device 252) and the consumer receives a discount on the purchase. From the secondary entity's perspective, a secondary transaction (e.g., transaction 152) is occurring relatively concurrently with the consumer transaction 184. From the retailer perspective, a transaction (e.g., commercial transaction 184) occurs where credit value 118 is being used in exchange for goods/services.

Overall, POS embodiment 250 functions as an arbitrage market, where a profit (which can be shared among participants) is realized since the market value of the credit value (118) is less than the face value, creating a realizable delta in value equivalent to the difference between the remuneration (135) paid for the credit value and the face value.

Web plug-in embodiment 260 is similar to embodiment 250, in that the secondary market transaction 152 occurs at approximately the time (or as part of) the commerce transaction 184. In embodiment 260, however, the commerce transaction 184 is an e-commerce transaction occurring via a Web interface, such as a browser. A plug-in 262 (e.g., a client-side or server-side software module) can perform the programmatic actions that trigger the use of credit value 118 (purchased from the secondary entity 136 as part of a secondary market transaction 252) for the e-commerce transaction instead of "cash". The "cash" can represent negotiable funds from an account, such as a credit card account, a debit account, a bank account, a PAYPAL or GOOGLE CHECKOUT account, and the like.

In one embodiment (a contemplated variant of embodiment 260), the consumer completing a purchase (commerce transaction 184) may be completely unaware that credit value 118 was used in lieu of negotiable funds (e.g., cash or cash equivalent). Instead, a facilitating agency involved in the commercial transaction (e.g., company providing point of sale services/equipment, PAYPAL, GOOGLE CHECKOUT, a credit card company, etc.) can institute the automatic substitution of credit value 118 for negotiable credit. This automatic substitution can result in a financial gain, which the facilitating agency receives (at least in part) for their services—all without negatively impacting the consumer or the retailer (who has already received compensation for the pre-paid credit value).

Figure 3:
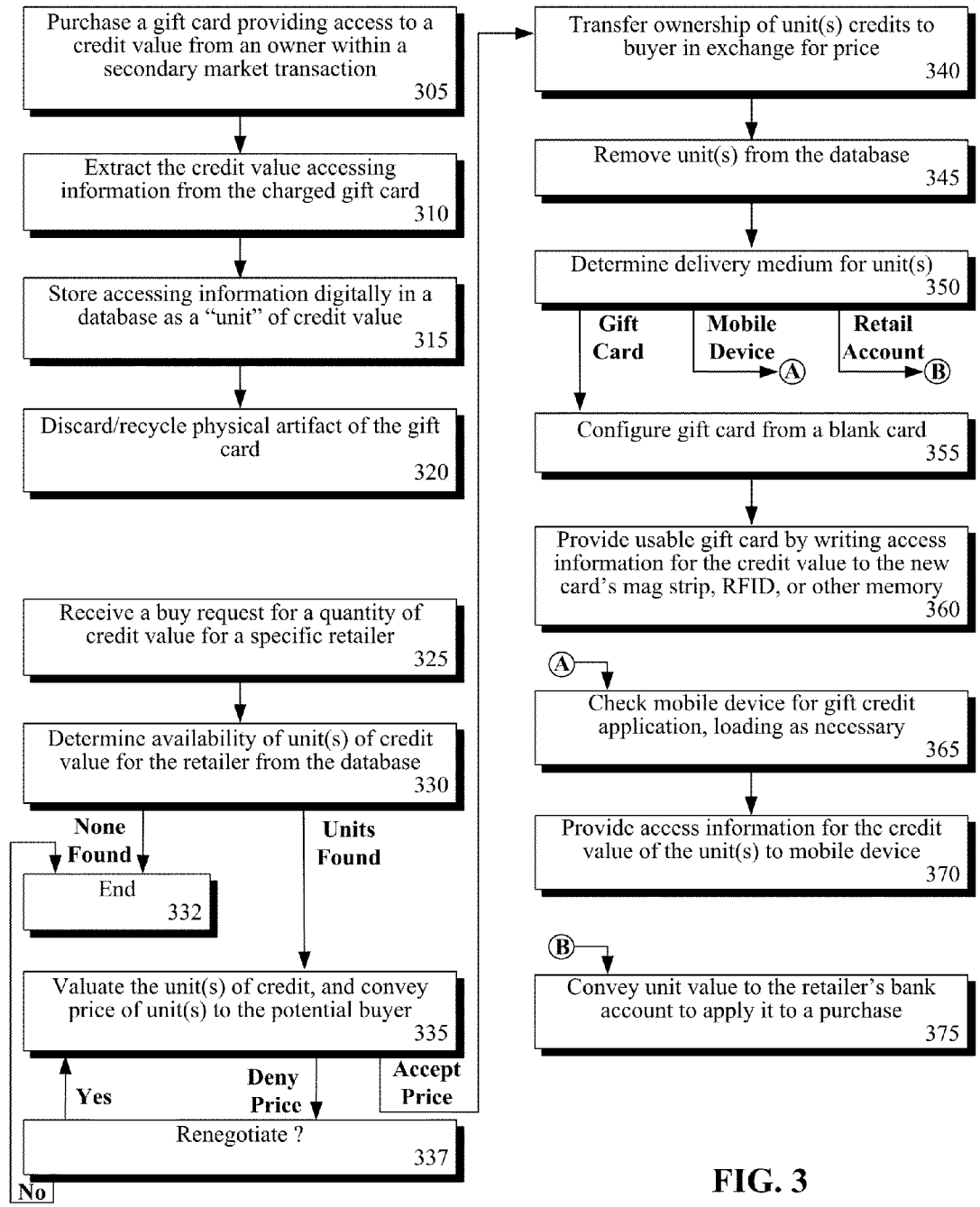
FIG. 3 is a flow chart for secondary market transactions for credit value of gift cards in accordance with an embodiment of the illustrative arrangements disclosed herein.

FIG. 3 is a flow chart for secondary market transactions for credit value of gift cards in accordance with an embodiment of the illustrative arrangements disclosed herein.

The flow chart shows a secondary market transaction (steps 305-320, which in one embodiment can represent transaction 132 of FIG. 1) for changing ownership of a gift card providing access to a credit value, where the physical artifact of the original gift card is optionally discarded or recycled in the process. Another transaction (steps 325-375, which in one embodiment can represent transaction 152 of FIG. 1) can transfer ownership of credit value from a secondary entity to a purchaser without transferring the physical artifact of the original gift card. The steps shown in FIG. 3 are for illustrative purposes only and derivative and alternative processes resulting in a similar overall functionality are contemplated.

In step 305, a gift card providing access to a credit value can be purchased as part of a secondary market transaction. The purchase can be from a current gift card holder by a secondary entity. As part of the purchase, physical possession of a gift card can be conveyed. During the transaction, the current gift card holder can be given value in exchange for giving the secondary entity ownership of the gift card. In step 310, credit value accessing information can be extracted from the gift card.

Typically, a gift card includes an access code (e.g., accessing information) linked to a remotely located server, which provides accounting for the gift card amount (e.g., credit value). A gift card accounting system can be used "behind-the-scenes" for commercial transactions involving gift cards. The gift card accounting system can have access to the "pre-paid" funds or the credit value. During a commercial transaction, the gift card accounting system can receive a message that includes the accessing information (from a gift card) and can responsively releases the funds (e.g., credit value) in an amount associated with the commercial transaction. These funds can be provided to the retailer (or to a bank account of the retailer).

In step 315, accessing information can be digitally encoded in a database of the secondary entity as a "unit" of credit value. Units of credit value are utilized, since each unit is effectively a "gift card record" associated with a set of funds maintained by the gift card accounting system. There are no guarantees regarding functionality of the gift card accounting system other than its ability to maintain the credit value and to provide it for consumer purchases responsive to receiving the correct accessing information.

In one embodiment, the gift card accounting system can support additional features (such as an ability to combine credit value across multiple different gift cards having different access information, an ability to limit values accessible to a single person or a single commercial purchase, etc.), which can be leveraged to positive effect by the present disclosure. Thus, use of these advanced features is contemplated and is considered within scope of the disclosure. An embodiment of the disclosure is, however, also able to function with any conventional gift card accounting system without requiring modifications of that system.

In step 320, once the credit value (or the credit value accessing information) has been obtained from the original gift card, the physical artifact of the original gift card can be discarded or recycled. Recycling can include re-branding (e.g., cleaning the card and changing the graphic, for example) the physical artifact, so it can be used to hold credit value during a different secondary market transaction.

It should be understood that steps 305-320 can be performed in various manners. For example, the steps can be a human-to-human transaction conducted at a storefront where gift cards can be redeemed and/or exchanged for value. In another embodiment, a human-to-kiosk transaction is possible, where the kiosk (or other automated device, such as a self-serve checkout machine) accepts the gift card and provides value to a human consumer in return. In another embodiment, a human can mail gift cards to a processing center, which provides value to the human upon receipt. Other transaction specifics are contemplated and those presented herein are provided as non-limiting illustrative examples.

In step 325, a process to provide a purchaser with access to credit value (previously obtained from a secondary market transaction) can begin. Specifically, a buy request for a gift card with a particular credit value for a specific retailer can be received. In step 330, availability of one or more gift cards with credit value for that retailer can be determined, such as by querying the secondary market database for records that match criteria of the buy request. If no matching gift cards with appropriate credit are found, the buy request cannot be satisfied and the process can end, as shown by step 332.

In an alternative implementation, a network of independent secondary entities can be established; where if one secondary entity lacks credit value to satisfy the buy request, he/she may automatically query other secondary entities in the network for request satisfying units. These units can be utilized immediately, as only digital information (e.g., the accessing information for the credit value) need be conveyed among secondary entities in the network. Thus, instead of ending in step 332, credit value may be found (from an alternative source—in a relatively immediate fashion), which would cause the process to progress to step 335.

In step 335, the units of credit value can be valuated. This step recognizes that credit value "market worth" may dynamically vary over time and that valuation can be dynamically adjusted as a result. For example, if the database contains an excess number of gift card records with credit value for a particular retailer (that isn't moving fast within the secondary market) a discount can be applied to encourage sale of these gift cards. In contrast, if few gift card records exist for a particular retailer, that is in demand and if the supply of that type of gift card or credit value is limited, then a premium (e.g., close to face value) price for the gift card or credit value can be established. Additionally, obtaining credit value from another source, may affect the cost of this credit value, since the secondary entity may have to pay a surcharge or a premium to receive the credit value from another.

Regardless, the potential purchaser can be presented with options and prices for their choice of gift card or credit value units that satisfy the buy request. This purchaser can either accept or refuse the asking price. Refusal of the price can trigger an optional renegotiation, as shown by step 337. If renegotiation isn't an option, the process can end in step 332. Otherwise, different gift cards or credit value units can be determined (not shown) and/or the request satisfying units can be re-valuated, as shown by progressing from step 337 to step 335.

Assuming the price is accepted, the secondary market transaction can continue, where ownership of one or more gift cards with units of credit is conveyed to the buyer in exchange for the price, as shown by step 340. Once sold, the unit(s) of credit value, which includes access information for utilizing the credit value that may be maintained by a gift card accounting system, can be removed from the secondary market database, as shown by step 345. A delivery medium can be selected for the gift cards with units of credit in step 350. Different delivery mediums may be available, such as receiving a gift card providing access to the credit value (e.g., accessing information for the credit value is provided and recorded on a gift card), delivering the credit value (or accessing information for the credit value) to a mobile device of the purchaser, providing the credit value to a retailer direct, and the like. In one embodiment, different surcharges can be accessed for different delivery mechanisms. Additionally, customization options can be provided for a possible optional cost, such as placing the credit value (or accessing information for the value credit) on a gift card having a customized graphic uploaded (or selected) by the buyer.

If delivery of the credit value (or accessing information for the value credit) is to a gift card, the gift card can be configured or selected in step 355. Configuring a gift card can include printing a custom graphic for a card in one embodiment. In step 360, the gift card can provide access to the credit value by writing access information for the credit value to a blank card's mag strip RFID, etc.

If delivery of the credit value (or accessing information) is to a mobile device (or other database/computing device of the buyer) of the buyer, an optional check can be performed in step 365. This check is to ensure the mobile device has all software necessary to accept and utilize the credit value. If software is lacking, it can be automatically downloaded to the buyer's device and configured, in one embodiment. In step 370, access information for the credit value of the purchased unit(s) can be conveyed to the buyer's device.

One contemplated option of the disclosure is to deliver the credit value directly to the retailer. For example, the delivery can occur during a commerce transaction 184 within which the secondary market transaction 154 is also conducted. An example of this is a buyer utilizing a retailer's point of sale (POS) device, which automatically conducts a secondary market transaction during the purchase phase of the commerce transaction. Thus, the POS device would pay for a portion of the commerce transaction using credit value instead of using cash or a cash equivalent, which can be economically beneficial as the credit value can be available for purchase in the secondary market for less than face value. In step 375, a retailer can be directly provided the credit value. For example, a retailer's bank account can be transferred funds (from a gift card accounting server that maintains the pre-paid funds, for example) in the same manner as if the consumer presented a gift card (containing the credit value obtained from the secondary market) at the POS.

Figure 4:
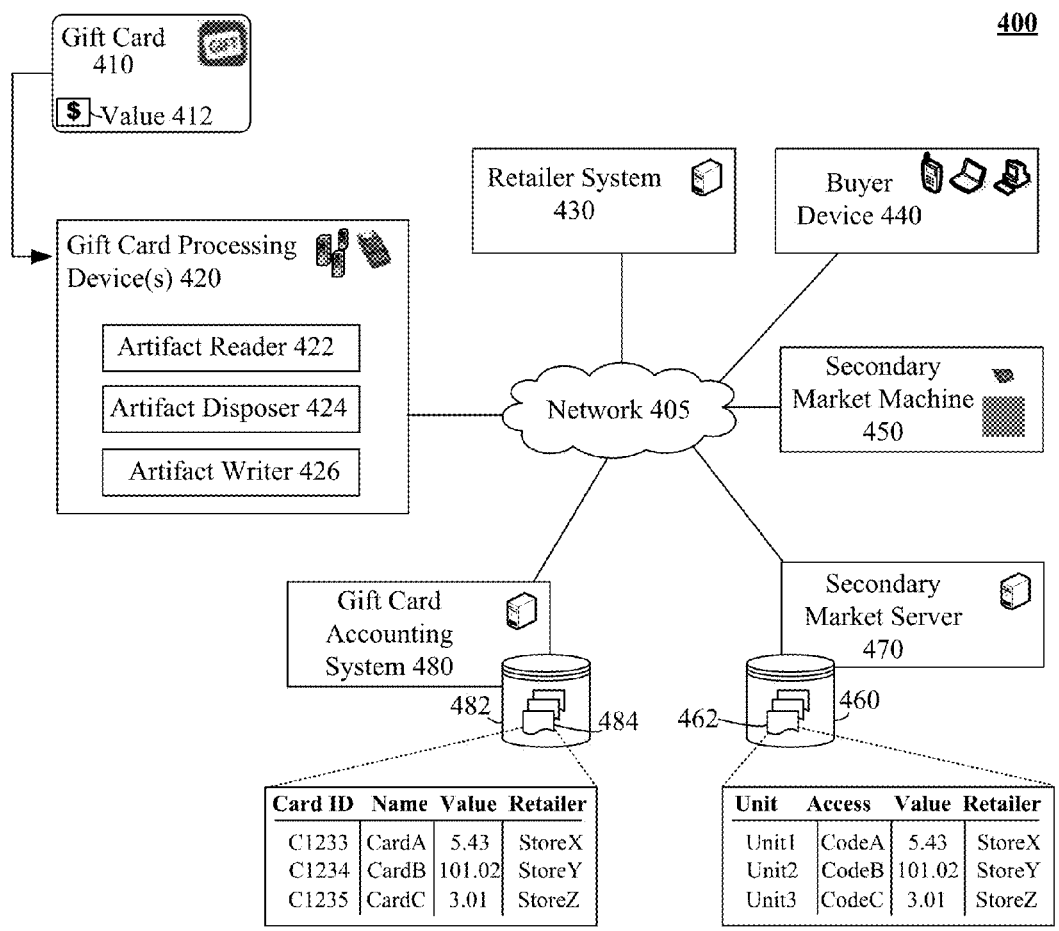
FIG. 4 shows a schematic diagram of a system for use of credit value of gift cards in accordance with an embodiment of the inventive arrangements disclosed herein.

FIG. 4 shows a schematic diagram of a system 400 for use of credit value of gift cards in accordance with an embodiment of the inventive arrangements disclosed herein. The system 400 represents an illustrative system for implementing the processes of FIG. 3 and the arrangements of FIGS. 1 and 2. System 400 is not to be construed as limiting, and other arrangements and derivatives are contemplated.

FIG. 4 shows a gift card 410 having a credit value 412 (or accessing information for the credit value) encoded within a storage medium, such as a mag strip, RFID, etc. The storage system on gift card 410 may also include other attributes, such as a gift card identifier, retailer, and the like. The gift card 410 can be a physical artifact, which can interface with gift card processing device(s) 420. The processing devices 420 can include an artifact reader 422 (able to read the credit value 412 or accessing information), an artifact disposer 424 (able to destroy or recycle the physical artifact of the gift card 410), and artifact writer 426 (able to make the credit value accessible from gift card 410), and the like. The gift card processing device(s) 420 can be located within a retailer storefront, a secondary market storefront or kiosk, and the like. Thus, a gift card processing device(s) 420 can be included in retailer system 430, buyer device 440, and/or secondary market POS machine 450.

The retailer system 430 can be a system where a commercial transaction between a buyer and the corresponding retailer is conducted. For example, the system 430 can include cash registers, an electronic commerce site for a retailer, a retailer's kiosk or self-service checkout machine, and the like. Retailer system 430 accepts gift card credit value 412 specific for the retailer.

Gift card accounting system 480 can be a system that maintains pre-paid funds (e.g., credit value 412) used by gift cards 410. Often, accessing information to the accounting system 480 is written on a gift card 410. The gift card accounting system 480 tracks the current value of each gift card 410. System 480 is also responsible for realizing credit value to retailers (e.g., retailer system 430) during a commercial transaction. The accounting system 480 can utilize a database 482, which maintains records for each gift card. Each record is indicated as a unit (484), which can include attributes such as a gift card identifier, a current value, a retailer, and the like. Transaction history of the gift card (purchases, amounts, locations, dates, etc.) can also be maintained in the database 482.

Secondary market machine 450 can be a machine used to interact with buyers/sellers during secondary market transactions relating to gift cards. Machine 450 can be any machine used by a secondary entity, such as a kiosk, a cash register, and the like. Secondary market machine 450 can directly interface with secondary market database 460.

This database 460 can maintain units 462 of gift card information belonging to the secondary market. Each unit 462 can be a database record that includes a set of attributes, such as a gift card identifier, a credit value, a retailer (or set of retailers), accessing information (for accessing the corresponding credit value maintained by system 480), and the like. Secondary market server 470 can include hardware/software for functions supporting the database 460 and machine 450.

In one embodiment, secondary market server 470, database 460, and machine 450 are maintained by a business entity not directly affiliated with the retailer (or directly linked to the retailing system 430) or with a gift card service provider (owner of gift card accounting system 482). That is, the secondary market transactions and any profits/advantages realized thereby can occur without requiring explicit approval or license from the retailer or gift card service provider.

Each of device 420, device 440, machine 450, server 470, retailer system 430 and gift card accounting system 480 can include one or more computing devices that execute computer program instructions that perform a set of one or more functions. Each computing device can include one or more processors, and one or more memories. Computer program instructions stored in the memories are able to be executed by the one or more processors. The computer program instructions can include software, firmware, and logic encoded in a digital circuit.

Network 405 can connect card processing devices 420, retailer system 420, buyer device 440, machine 450, server 470, database 460, and/or system 480. Network 405 can include any hardware/software/and firmware necessary to convey data encoded within carrier waves. Data can be contained within analog or digital signals and conveyed though data or voice channels. Network 405 can include local components and data pathways necessary for communications to be exchanged among computing device components and between integrated device components and peripheral devices. Network 405 can also include network equipment, such as routers, data lines, hubs, and intermediary servers which together form a data network, such as the Internet. Network 405 can also include circuit-based communication components and mobile communication components, such as telephony switches, modems, cellular communication towers, and the like. Network 405 can include line based and/or wireless communication pathways.

Database 460 and 482 can represent data stores able to be physically implemented within any type of hardware including, but not limited to, a magnetic disk, an optical disk, a semiconductor memory, a digitally encoded plastic memory, a holographic memory, or any other recording medium. It should be appreciated that database 460 and 482 are independent from each other, and are maintained by different entities (shown by gift card accounting system 480 and secondary market server 470). Additionally, each of the data stores 460 and 482 can be a stand-alone storage unit as well as a storage unit formed from a plurality of physical devices. Additionally, information can be stored within data stores 460 and 482 in a variety of manners. For example, information can be stored within a database structure or can be stored within one or more files of a file storage system, where each file may or may not be indexed for information searching purposes. Further, data stores 460 and 482 can utilize one or more encryption mechanisms to protect stored information from unauthorized access.

The diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for conveying credit value of a gift card to a purchaser within a secondary market independent of physical transfer of the gift card originally charged with the credit value comprising:
   receiving a gift card from a gift card holder, wherein said gift card is a physical artifact that provides access to a credit value, said credit value being valid only for at least one specific retailer, wherein said gift card is a bearer instrument able to be utilized independent of an identity of a user of the gift card, thereby permitting any holder of the gift card to utilize the gift card regardless of holder identity;
   remunerating the gift card holder in a first secondary market transaction in exchange for transfer of gift card ownership from the gift card holder to a secondary entity; and
   reselling the credit value of the gift card in a second secondary market transaction in which ownership of the credit value is transferred from the secondary entity to a value purchaser, wherein the reselling occurs without physically transferring the gift card received from the gift card holder to the value purchaser, wherein after the reselling occurs, the value purchaser is able to utilize the credit value in commerce transactions with the at least one specific retailer, during the reselling, transferring a second gift card to the value purchaser, wherein the second gift card is a physical artifact that provides access to the credit value, wherein the gift card from the gift card holder, which is referred to as the first gift card, has a graphic printed on it associating it with at least one specific retailer, wherein the second gift card has a different graphic printed on it than the first gift card, wherein the different graphic of the second gift card has a mark, icon, text or other identifier that corresponds to the secondary entity that visually indicates to the value purchaser that the second gift card is associated with the second market entity, wherein the first gift card lacks any mark, text, or other identifier that corresponds to the secondary entity.

2. The method of claim 1, wherein the secondary entity is remunerated in cash or cash equivalent for the facilitating transfer of ownership of the credit value between the gift card holder and the value purchaser, wherein the gift card holder is remunerated in cash or cash equivalent in an amount less than the credit value for transfer of ownership of the credit value to the secondary entity, wherein the value purchaser purchases credit value from the secondary entity for a price in cash or cash equivalent that is less than the credit value for the at least one specific retailer.

3. The method of claim 1, further comprising:
   upon transfer of gift card ownership, copying access information from the gift card and storing it in a database; and during the reselling of the credit value, writing the access information from the database to a new gift card, which is provided to the value purchaser.

4. The method of claim 1, wherein a secondary entity receives the gift card from the gift card holder, wherein said gift card is referred to as an original gift card, wherein the original gift card comprises identification and access information for the credit value, wherein said access information provides access to a gift card accounting system, which maintains the value of the original gift card with a data base, wherein the secondary entity resells the credit value in a form of a different physical gift card, which includes information identical to the original gift card and therefore provides access to the credit value.

5. The method of claim 1, wherein said gift card comprises:
 a graphic printed on the gift card that includes a mark, icon, text, or other identifier that corresponds to at least one specific retailer;
 access information associated with a credit value for the at least one specific retailer, wherein the gift card is a bearer instrument, wherein the gift card is a non-negotiable instrument, wherein gift card provides access to the credit value as a bearer is able to present the gift card the at least one specific retailer during a transaction in which the bearer purchases goods or services from the at least one retailer wherein the credit value of the gift card is utilized as an equivalent of cash during the transaction, wherein the credit value of the gift card was placed on the gift card during a secondary market transaction during which ownership of the credit value was transferred, wherein an original gift card that provided access to the credit value is a physical artifact different from the gift card.

6. The method of claim 1, further comprising:
 the secondary entity purchasing the gift card from the card holder, wherein the gift card provides access to a quantity of pre-paid credit referred to as the credit value for a particular retailer, where the gift card comprises access information for this credit value, wherein said access information provides access to a gift card accounting system, which maintains the value of the gift card with a data base;
 the secondary entity transferring complete information from the original gift card, including identification and access information to a different gift card, wherein the different gift card provides access to the credit value in a manner substantially identical to the manner used by the original gift card; and
 the secondary entity selling the different gift card to the value purchaser.

7. The method of claim 1, wherein the second gift card stores different credit values, each of the different credit values being for specific ones of a plurality of different retainers, said second gift card further comprising an input mechanism, a value indicator, a store indicator, and a storage medium readable by a retail point of sale, said method further comprising:
 receiving a customer selection of the input mechanism;
 responsive to the selection, the second gift card changing information displayed in the value indicator and information shown in the store indicator, wherein before the changing responsive to the selection:
  i) a first one of the different retailers is active for the second gift card;
  ii) the second gift card displays information within the value indicator and the store indicator information specific to the first one of the different retailers; and
  iii) the second gift card provides accessible information to a retail point of sale for only the first one of the different retailers
 wherein after the changing responsive to the selection:
  i) a second one of the different retailers is active for the second gift card;
  ii) the second gift card displays information within the value indicator and the store indicator information specific to the second one of the different retailers; and
  iii) the second gift card provides accessible information to a retail point of sale for only the second one of the different retailers.

8. A method comprising:
 receiving a first gift card from a gift card holder, wherein said first gift card is a physical artifact that provides access to a credit value, said credit value being valid only for at least one specific retailer, wherein said gift card is a bearer instrument able to be utilized independent of an identity of a user of the gift card;
 transferring the credit value from the first gift card to a second gift card, wherein said second gift card is a physical artifact that stores different credit values, each of the different credit values being for specific ones of a plurality of different retainers, said second gift card further comprising an input mechanism, a value indicator, a store indicator, and a storage medium readable by a retail point of sale;
 receiving a customer selection of the input mechanism of the second gift card; and
 responsive to the selection, the second gift card changing information displayed in the value indicator and information shown in the store indicator, wherein before the changing responsive to the selection:
  i) a first one of the different retailers is active for the second gift card;
  ii) the second gift card displays information within the value indicator and the store indicator information specific to the first one of the different retailers; and
  iii) the second gift card provides accessible information to a retail point of sale for only the first one of the different retailers
 wherein after the changing responsive to the selection:
  i) a second one of the different retailers is active for the second gift card;
  ii) the second gift card displays information within the value indicator and the store indicator information specific to the second one of the different retailers; and
  iii) the second gift card provides accessible information to a retail point of sale for only the second one of the different retailers.

9. A method comprising:
 receiving a gift card from a gift card holder, wherein said gift card is a physical artifact that provides access to a credit value, said credit value being valid only for at least one specific retailer, wherein said gift card is a bearer instrument able to be utilized independent of an identity of a user of the gift card, thereby permitting any holder of the gift card to utilize the gift card regardless of holder identity;
 remunerating the gift card holder in a first secondary market transaction in exchange for transfer of gift card ownership from the gift card holder to a secondary entity;

reselling the credit value of the gift card in a second secondary market transaction in which ownership of the credit value is transferred from the secondary entity to a value purchaser, wherein the reselling occurs without physically transferring the gift card received from the gift card holder to the value purchaser, wherein after the reselling occurs, the value purchaser is able to utilize the credit value in commerce transactions with the at least one specific retailer, wherein the value purchaser accesses the credit value using a mobile device, wherein said mobile device stores different credit values, each of the different credit values being for specific ones of a plurality of different retainers, said mobile device further comprising an input mechanism, a value indicator, a store indicator, and a set of unique data for the different credit values, said unique data being provided by the mobile device to a retail point of sale device; said method further comprising:

receiving a customer selection of the input mechanism of the mobile device; and responsive to the selection, the mobile device changing information displayed in the value indicator and information shown in the store indicator, wherein before the changing responsive to the selection:

iv) a first one of the different retailers is active for the mobile device;

v) the mobile device displays information within the value indicator and the store indicator information specific to the first one of the different retailers; and vi) the mobile device provides accessible information to a retail point of sale for only the first one of the different retailers wherein after the changing responsive to the selection:

iv) a second one of the different retailers is active for the mobile device;

v) the mobile device displays information within the value indicator and the store indicator information specific to the second one of the different retailers; and vi) the mobile device provides accessible information to a retail point of sale for only the second one of the different retailers.

10. The method of claim 9, wherein the mobile device is a second gift card.

11. The method of claim 9, wherein the mobile device is a phone running a gift card application, wherein the input mechanism, the a value indicator, and the a store indicator are graphical user interface elements of the gift card application.

* * * * *